UNITED STATES PATENT OFFICE 2,241,868

METHOD OF PROCESSING BLOOD

Albert Reimann, Ludwigshafen-on-the-Rhine, Germany, assignor to Hall Laboratories, Inc., Pittsburgh, Pa., a corporation of Pennsylvania No Drawing. Application November 2, 1938, Serial No. 238,396. In Germany September 10, 1937

4 Claims. (Cl. 260—112)

This invention relates to a method of processing blood and especially animal blood, and products made therefrom.

Heretofore it has been the practice to add sodium citrate, sodium lactate and the like to blood to prevent or check coagulation of blood, whereby the fibrin may be held in solution. Blood so treated has been used in the preparation of cold glue; it has also been used for the making of blood sausage and other articles of food made from or with animal blood. Because of the intense color of blood, the use of blood treated with admixtures to hold the fibrin in solution, is very limited in the arts.

In accordance with this invention, the useful field for fibrin containing blood may be enormously increased if the blood be processed in a suitable manner. For instance, the blood may be processed by adding thereto admixtures which hold the fibrin in solution and check or prevent coagulation thereof, and then dividing or separating the blood so treated into liquid fibrin containing serum and into essentially fibrin-free separable blood corpuscles.

The fibrin containing serum has essentially all the properties of the fibrin contained in blood in which the coagulation has been checked or prevented with the exception that the undesirable blood color is avoided.

In the practice of the invention it is preferred that the separation of the fibrin containing serum from the blood corpuscles be carried out quickly and as soon as possible after the admixtures have taken effect.

While it is known that sodium citrate, sodium lactate and the like have been used as additions to blood to hold the fibrin in solution, this invention contemplates the use also of salts of water poor phosphoric acids such as have a water of constitution less than that of the orthophosphoric acids, for example, salts of the pyro, meta, and polyphosphoric acids. The use of these phosphoric acid salts has the especial advantage in that the separation of red blood corpuscles from the serum may be effected more quickly and easily.

Since the phosphates in question are generally cheaper than for example the heretofore used sodium citrate and sodium lactate, and since smaller quantities of the phosphates, for example sodium pyrophosphate or metaphosphate, are required, economies may be realized.

The red corpuscles can be separated from the blood in the simplest manner by settling, although it is preferred to make this separation by centrifuging or filtering. The settling method is not to be used where maximum separation of the red corpuscles is desired, because with the settling process the red blood corpuscles remain partly attached to or in solution with the serum.

For many purposes it is advantageous to concentrate or to dry the fibrin containing blood serum and this step may be carried out under the same conditions by which coagulation of egg albumin is avoided as for example evaporation under reduced pressure. Also, the separated, essentially free from fibrin material can be further dewatered and/or fully dried by heat treatment under reduced pressure.

The fibrin containing blood serum has properties that resemble strongly the white of chicken eggs, milk casein and also gelatine, so that the fibrin containing blood serum can be applied, if necessary, in concentrated or also in dry form, in the practice of this invention, as a substitute or partial substitute for the above mentioned substances that were formerly used, and especially to cases where the white of chicken eggs has been used.

The fibrin containing blood serum can be used among other things as a base for glue and/or adhesives instead of bone and/or casein glue, as well as for cold glue which has heretofore been prepared from fibrin containing blood. In the preparation of glue an advantage is to be gained by the use of fibrin containing blood serum in that it has a light color so that such glue is rendered suitable for the manufacture of wood veneers and paper products where the dark color of the prior art blood glue has been objectionable.

The fibrin containing blood serum has proved to be very suitable for the manufacture of meat products, especially as binding material, for example in place of gelatine which has been widely used heretofore; and in regard to this it may be used in liver and meat sausage to increase its nutritive value.

Also in the preparation of preserved meats, pickled meats and jellies, the fibrin containing blood serum provides an excellent binding material. The use of fibrin containing serum also makes possible the use of the most essential and the most valuable food ingredients of the blood. Prior to this invention the meat products industry could not make use of these blood ingredients to the extent which this invention makes possible, because such products would not be acceptable on account of the blood color. In accordance with this invention a blood fibrin serum may be used in the manufacture of products such as liver sausage, jellies and the like. Prior to this invention blood was used only in the manufacture of such products as blood sausage in which could be incorporated the hemoglobin.

The fibrin-free blood corpuscles made in accordance with the process of this invention are suitable because of their purity, may be incorporated in a large variety of food products and may be used in many fields of industry. This material is also especially useful in the production of pharmaceutical preparations containing hemoglobin.

Also in the preparation of blood-colored meat products, such as blood sausage, blood stomach rind, tongue sausage, blood cheese, etc., the blood corpuscles obtained as by-products are particularly suitable because thereby the blood color may be intensified.

*Examples*

Approximately 100 g. sodium citrate or approximately 50 g. sodium pyrophosphate was added to 6 to 7 liters of blood. The salt may be added in predissolved form and a small portion, less than 50%, is poured into a pan or vessel in which the blood is collected. The balance is poured into a reservoir in which the blood without addition of salt, is stirred and/or agitated. On pouring the blood from the collecting pan into the reservoir care must be taken that the blood is thoroughly mixed with the salt solution. The blood corpuscles may be separated from the serum by centrifuging, filtration or simple settling. In some cases where fresh blood is treated in the manner herein indicated to prevent coagulation whereby the fibrin is maintained in solution, a continuous centrifuging of the blood thus treated to separate it into essentially fibrin-free blood corpuscles and fibrin containing serum may be employed. If the centrifuging is carried on to extremes the blood corpuscular mass so obtained may contain so little fibrin that it will not have enough adhesive power to be of value in the preparation of blood-colored meat or sausage products. Also, the fibrin containing serum if completely separated results in the production of a blood corpuscular mass which is so thick that continuous centrifuging would not be practicable.

According to this invention it is proposed to so modify the centrifuging procedure that the red blood corpuscular mass will contain sufficient fibrin for binding purposes. A good yield of fibrin containing serum may thus be obtained without running into the difficulties which would arise by complete separation. It is thus proposed to so centrifuge the fresh blood which has been treated to prevent coagulation and to maintain the fibrin in solution that the blood corpuscular mass can flow continuously from the centrifugal separator in thick liquid form, thus for example two parts of the liquid fibrin containing blood serum and one part of a thick fluid blood corpuscular mass consisting of blood corpuscles and fibrin containing serum may be obtained.

What I claim as my invention and desire to secure by Letters Patent is:

1. A method of processing blood that comprises adding to fresh blood a salt of phosphoric acid which is poorer in water of constitution than the orthophosphoric acids to thereby prevent coagulation and hold the fibrin in solution and then separating the blood thus treated into a liquid fibrin containing serum and fibrin-free blood corpuscles.

2. A method according to claim 1 characterized by the fact that the essentially fibrin-free blood corpuscles are separated by mechanical means from the fibrin containing serum and are further dried by heat treatment under partial vacuum.

3. A process for treating animal blood which comprises adding thereto a salt of the phosphoric acids which are poorer in water of constitution than orthophosphoric acids and then separating the treated blood in a centrifuge into liquid fibrin containing serum and a thick liquid, blood corpuscular mass.

4. A process according to claim 3 characterized by the fact that the separation process is carried out continuously under such conditions that the ratio of the thin fibrin containing serum to the thick liquid blood corpuscular mass containing liquid fibrin serum, is approximately 2 to 1.

ALBERT REIMANN.